(12) United States Patent  (10) Patent No.: US 7,713,169 B2
Earp et al.  (45) Date of Patent: May 11, 2010

(54) METHOD OF CONTROLLING A VEHICLE TRANSMISSION

(75) Inventors: Leonard Earp, Wrexham (GB); David Allan Wozencraft, Oswestry (GB); Glyn Clifford Price, Mold (GB)

(73) Assignee: J.C. Bamford Excavators Limited, Uttoxeter (GB)

( * ) Notice: Subject to any disclaimer, the term of this patent is extended or adjusted under 35 U.S.C. 154(b) by 405 days.

(21) Appl. No.: 11/866,768

(22) Filed: Oct. 3, 2007

(65) Prior Publication Data

US 2008/0081738 A1   Apr. 3, 2008

(30) Foreign Application Priority Data

Oct. 3, 2006   (GB) .................................. 0619501.0

(51) Int. Cl.
*F16H 61/26* (2006.01)
(52) U.S. Cl. .................. 477/127; 477/130; 477/131
(58) Field of Classification Search ................ 477/124, 477/127, 130, 131
See application file for complete search history.

(56) References Cited

U.S. PATENT DOCUMENTS

| | | | |
|---|---|---|---|
| 2,953,942 A | 9/1960 | Schwartz et al. | |
| 2,972,901 A | 2/1961 | Gerst | |
| 3,319,745 A | 5/1967 | Hilpert | |
| 3,675,508 A | 7/1972 | Blank | |
| 3,916,714 A | 11/1975 | Sisson et al. | |
| 4,063,464 A | 12/1977 | Crabb | |
| 4,627,302 A | 12/1986 | Laylock et al. | |
| 4,721,002 A | 1/1988 | Horii | |
| 4,785,682 A | 11/1988 | Nishimura et al. | |
| 4,877,116 A | 10/1989 | Horsch | |
| 5,007,299 A | 4/1991 | Bulgrien | |
| 5,181,431 A | 1/1993 | Zaiser | |
| 5,251,132 A | 10/1993 | Bulgrien | |
| 5,674,153 A * | 10/1997 | Jang | 477/131 |
| 6,209,407 B1 | 4/2001 | Heinzel et al. | |
| 6,250,171 B1 | 6/2001 | Sperber et al. | |
| 6,491,604 B1 | 12/2002 | Katou et al. | |
| 6,511,401 B2 * | 1/2003 | Lee | 477/131 |
| 7,052,436 B2 * | 5/2006 | Dobele | 477/141 |
| 2008/0053261 A1 | 3/2008 | Wright | |

FOREIGN PATENT DOCUMENTS

| | | |
|---|---|---|
| DE | 3410802 | 10/1984 |
| DE | 10232837 | 2/2004 |
| EP | 0087681 | 9/1983 |
| EP | 0354890 | 2/1990 |
| GB | 1190972 | 5/1970 |

(Continued)

*Primary Examiner*—Ha D. Ho
(74) *Attorney, Agent, or Firm*—Greenlee Winner and Sullivan PC (57) ABSTRACT

A method of controlling a vehicle transmission during a gear change thereof, the method comprising operating a plurality of power shift clutches to disengage the power shift input gearing and the power shift output gearing, disengaging the driving connection between the range shift input shaft and the range shift output shaft by means of the range selection gearing, engaging at least two of the power shift clutches to vary the rotational speed of the power shift output shaft and hence the range shift input shaft, and operating the range selection gearing to establish a driving connection between the range shift input shaft and the range shift output shaft.

17 Claims, 5 Drawing Sheets

FOREIGN PATENT DOCUMENTS

| | | |
|---|---|---|
| GB | 2271821 | 4/1994 |
| GB | 0619502 | 11/2006 |
| GB | 0714320 | 8/2007 |
| JP | 05157163 A * | 6/1993 |
| JP | 06001164 A * | 1/1994 |
| WO | WO2004/076888 | 9/2004 |
| WO | WO2008/0116562 | 10/2008 |

* cited by examiner

METHOD OF CONTROLLING A VEHICLE TRANSMISSION

CROSS-REFERENCE TO RELATED APPLICATIONS

This application claims priority under 35 USC 119(a)-(d) to United Kingdom Patent Application No. GB 0619501.0 filed on Oct. 3, 2006, which is incorporated by reference in its entirety herein.

BACKGROUND OF THE INVENTION

This invention relates a method of controlling a vehicle transmission. 'Vehicle transmission' here refers to a transmission to be interposed between a prime mover of the vehicle and ground engaging means of the vehicle which provides a plurality of gear ratios by which the ground-engaging means can be driven by the prime mover. The transmission has been devised primarily, but not exclusively, for a material handling vehicle, such as, for example, a tractor, loader type or similar vehicle for industrial and/or agricultural use, in which the ground engaging means typically comprises wheels but could also comprise crawler tracks.

Vehicles such as tractors or loaders have conventionally used transmission which provide a range of forward gear ratios. With a range of such transitions that the vehicle needs to develop useful tractive effort over a wide range of speeds. For example, in bottom gear the vehicle may be designed to have a maximum speed of 1.5 kph and in top gear have a maximum speed of 65 kph, to permit the vehicle to operate at low speed whilst under load, but enable the vehicle to travel at an adequate speed when travelling along a road.

To provide a wide range of close ratios, it is known to provide a transmission having effectively a pair of gear boxes, a first gear box drivingly connected to the engine and providing a first range of ratios and a reverse gear, and a second gear box connected to the output of the first gear box and providing a plurality of selectable gear ranges. The output of the second gear box is then connected to the ground engaging means. Consequently, where the first gear box provides six gears and the second gear box provides four gear ranges, it will be apparent that there are 24 torque paths through the transmission. It would be apparent that there may be a number of different torque paths which provide the same or overlapping speed ranges. Ideally, the selected gear should use the lowest possible range gear provided by the second gearbox. Advantageously, gear selection is performed by an electronic control unit which controls a solenoid to supply fluid to power shift clutches or operates a solenoid to move the synchromesh clutches in response to a gear shift demand from the operator. However, a problem with the second gear box, when it uses synchromesh clutches, is that it is desirable to effect the range shift as quickly as possible. For example, when travelling up an incline, it is desirable that an up-shift is effected as quickly as possible, because a slow gear change can result in the vehicle slowing excessively or even rolling backward. This is because, unlike power shift gear boxes, synchromesh gear boxes do not permit an unbroken supply of torque during upshift as it is necessary for the intermeshing parts of the gears to synchronise. A fast gearshift will also improve operator 'feel', by presenting a more responsive transmission.

SUMMARY OF THE INVENTION

According to a first aspect of the invention, we provide a method and control unit for controlling a vehicle transmission during a gear change thereof, the vehicle transmission having a power shift gearbox and a range shift gearbox, the power shift gearbox having a power shift input shaft, a power shift output shaft, power shift input gearing and power shift output gearing, and a plurality of power shift clutches to drivingly connect the power shift input gearing and the power shift output gearing, the range shift gearbox having a range shift input shaft drivingly connected to the power shift output shaft, a range shift output shaft and range selection gearing to drivingly connect the range shift input shaft and range shift output shaft, the method comprising the steps of operating the plurality of power shift clutches to disengage the power shift input gearing and the power shift output gearing, disengaging the driving connection between the range shift input shaft and the range shift output shaft by means of the range selection gearing, engaging at least two of the power shift clutches to retard the rotational speed of the power shift output shaft and hence the range shift input shaft, and operating the range selection gearing to establish a driving connection between the range shift input shaft and the range shift output shaft.

The method may include the subsequent step of controlling the plurality of power shift clutches to establish a driving connection between the power shift input shaft and power shift output shaft.

The plurality of power shift clutches may comprise a first plurality of power shift clutches operable to connect the power shift input gearing to an intermediate gearing and a second plurality of power shift clutches operable to connect the intermediate gearing to the power shift output gearing, and wherein the step of operating the plurality of power shift clutches to disengage the power shift input gearing and the power shift output gearing may comprise disengaging the first plurality of power shift clutches.

The step of operating the power shift clutches may comprise dithering the fluid pressure supplied to the clutches.

The method may be carried out during an up-shift gear change.

The step of engaging at least two of the power shift clutches may retard the rotational speed of the power shift output shaft.

The step of operating at least two of the power shift clutches may comprise operating at least two of the second plurality of power shift clutches.

The rotational speed of the range shift input shaft may be retarded until the ratio of the rotational speeds of the range shift input shaft and the range shift output shaft reaches a desired value.

The desired value may correspond to the rotational speeds of the meshing gears of the range shift gearing being substantially equal.

The method may be carried out during a down shift gear change.

The step of engaging at least two of the powershift clutches may comprise engaging one of the first plurality of clutches and one of the second plurality of clutches.

The powershift clutches are operated to select a higher ratio torque path through the powershift gear box.

The method may comprise the step of receiving a gear shift request from an operator control, and identifying that the shift requires a range shift change.

The rotational speed of the range shift input shaft may be monitored by a first sensing means.

The rotational speed of the range shaft output shaft may be monitored by a second sensing means.

Data from the first and second sensing means may be compared to determine whether further variation of the speed of the input gearing is required.

BRIEF DESCRIPTION OF DRAWINGS

An embodiment of the invention will now be described by way of example only with reference to the accompanying drawings, wherein.

DETAILED DESCRIPTION

Figure 1:
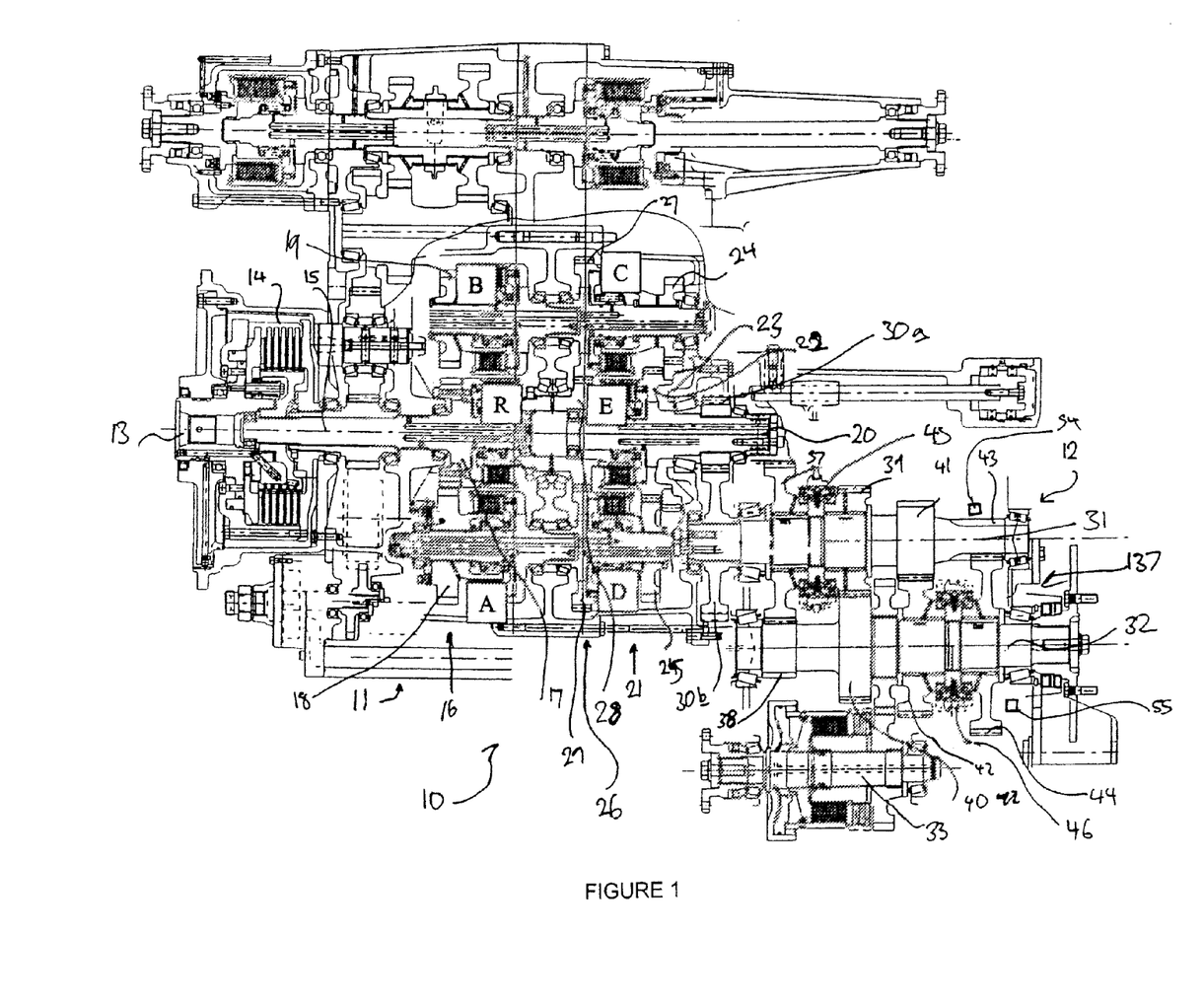
FIG. 1 is a sectional view of a transmission embodying the present invention.
Figure 2:
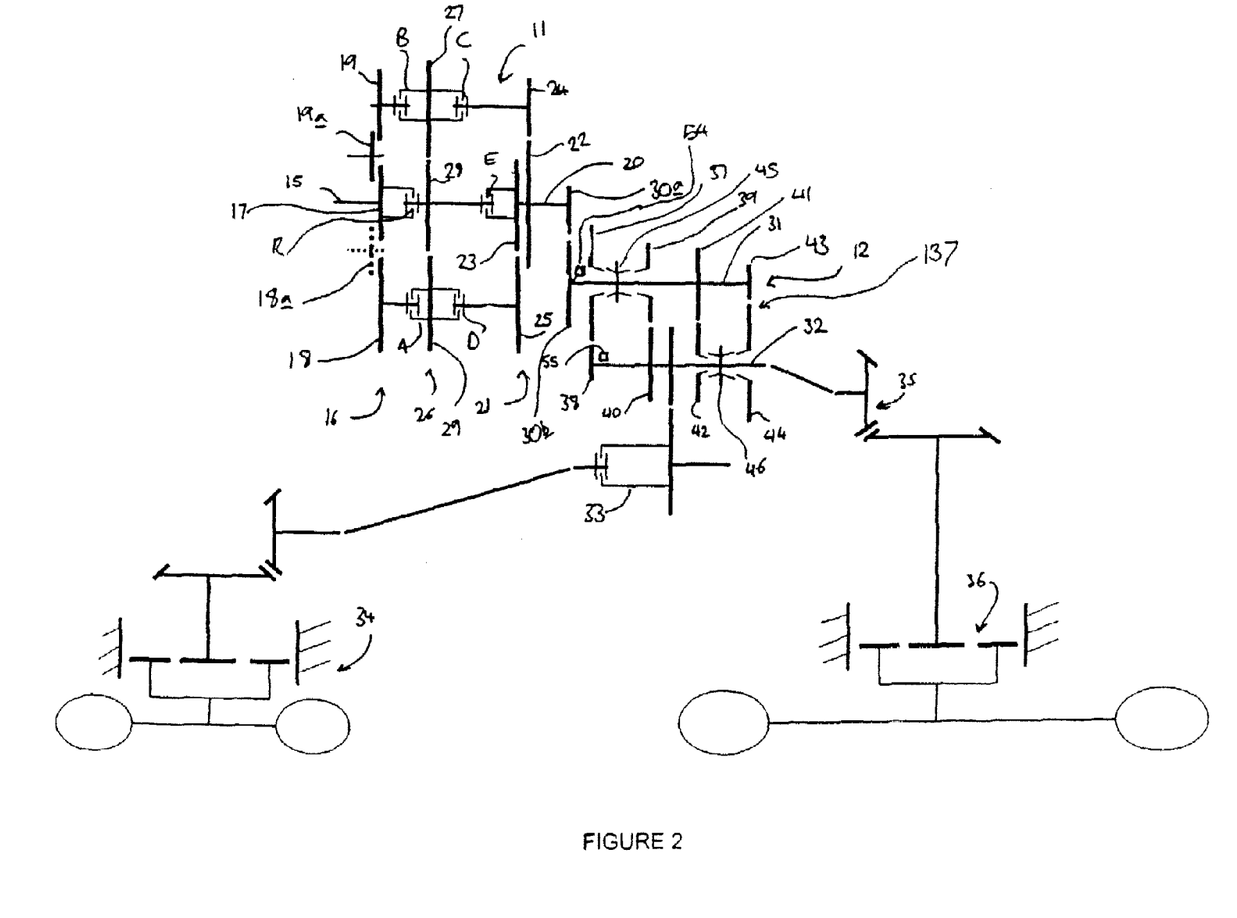
FIG. 2 is a diagrammatic illustration of the transmission of FIG. 1.

Referring now to FIGS. 1 and 2, a transmission embodying the present invention is generally shown at 10. The transmission 10 comprises a first, power shift, gearbox generally shown at 11 and a second, range shift gear box generally shown at 12. The power shift gear box 11 has an input connection shown at 13 to receive drive from an engine or other prime mover. The engine input 13 is connected via a main clutch 14 to an input shaft 15 which drives input gearing generally shown at 16. The input gearing 16 comprises a main gear 17 supported on the input shaft 15, which drives a first input gear 18 and a second input gear 19 through idler wheels at 18a, 19a respectively on FIG. 2.

The power shift gear box 11 further comprises an output shaft 20 which in this example is co-axial with the input shaft 15. The power shift gearbox 11 has an output gearing as generally shown as 21 comprising a first output gear 22 and second output gear 23 mounted on the output shaft 20. The first output gear 22 is in mesh with third output gear 24 and second output gear 23 is in mesh with fourth output gear 25.

The power shift gear box 11 further comprises intermediate gearing shown at 26 comprising a first intermediate gear shown at 27, a second intermediate gear shown at 28 and a third intermediate gear shown at 29. The second intermediate gear 28 is in mesh with intermediate gears 27 and 29.

To provide torque paths through the power shift gear box, six power shift clutches are provided labelled A, B, C, D, E and R. Power shift clutch A is operable to provide a driving connection between the first input gear 18 and third intermediate gear 29; power shift clutch B is operable to provide a driving connection between second input gear 19 and first intermediate gear 27; power shift clutch C is operable to provide a driving connection between first intermediate gear 27 and the third output gear 24; power shift clutch D is operable to provide a driving connection between the third intermediate gear 29 and the fourth output gear 25; and power shift clutch E is operable To provide a driving connection between the second intermediate gear 28 and the output shaft 20.

Power shift clutch R is operable to provide a reverse gear, and is operable to connect the input shaft 15 to second intermediate gear 28.

Power shift clutches A, B and R provide a first plurality of clutches which are referred to as being on the "input side" of the first gear box 11 as they are operable to connect the input gearing 16 to the intermediate gearing 26. Power shift clutches C, D, and E provide a second plurality of the output clutches and are referred to as being on the "output side" of the first gear box 11 as they are operable to connect the output gearing 21 to the intermediate gearing 26. A torque path is provided by engaging one of the first plurality of power shift clutches and one of the second plurality of power shift clutches. Consequently, it will be apparent that there are nine torque paths through the first gear box 11, six forward gears and three reverse gears.

The output shaft 20 drives a power shift output gear 30a which supplies drive to the range shift gear box 12 through gear 30b.

The range shift gear box 12 comprises a range shift input shaft 31 driven through gear 30b and a range-shift output shaft 32. The range shift output shaft 32 is connected via forward output gearing generally shown at 33 to provide front wheel drive to the front wheel axle assembly generally shown at 34, and is also connected through the rear output gearing generally shown at 35 to provide drive to a rear axle assembly generally shown at 36. The range shift gear box 12 comprises range shift gearing 137 to drivingly connect the range shift input shaft 31 and the range shift output shaft 32.

In this example, the range selection gearing 137 comprises four pairs of gears, one gear of each pair being mounted on the range shift input shaft 31 and the other on the range shift output shaft 32. To provide a high ratio, the first range shift input gear 37 is mounted on the range shift input shaft 31 and is in mesh with first range shift output gear 38 provided on the range shift output shaft 32. Similarly, to provide a medium gear ratio, second range shift input gear 39 is in mesh with second range shift output gear 40; third range shift input gear 41 is in mesh with third range shift output gear 42 to provide a low range and fourth range shift input gear 43 is in mesh with fourth range shift output gear 44 to provide an extra low gear range. A first synchromesh clutch is provided as shown at 45 to selectively clutch one of first range shift gear 37 and second range shift gear 39 to the range shift input shaft 31. A second synchromesh clutch 46 is provided operable to clutch one of the third range shift output gear 42 and fourth range shift output gear 44 to the range shift output shaft 32. The first synchromesh clutch 45 and second synchromesh clutch 46 are interlocked such that only one of the clutches 45, 46 can be engaged at a time. Consequently, it will be apparent that there are four possible torque paths through the range shift gear box 12. Each torque path is selectable by operating one of the first synchromesh clutch 45 and the second synchromesh clutch 46, while the other of the first synchromesh clutch 45 and the second synchromesh clutch 46 is in neutral, to provide the desired driving path.

When operated the synchromesh clutches 45, 46 and powershift clutches may be 'dithered', that is the fluid pressure supplied to the powershift clutches or the electrical power sent to the synchromesh clutches may be varied slightly about the control level to avoid 'stickiton'.

Figure 3:
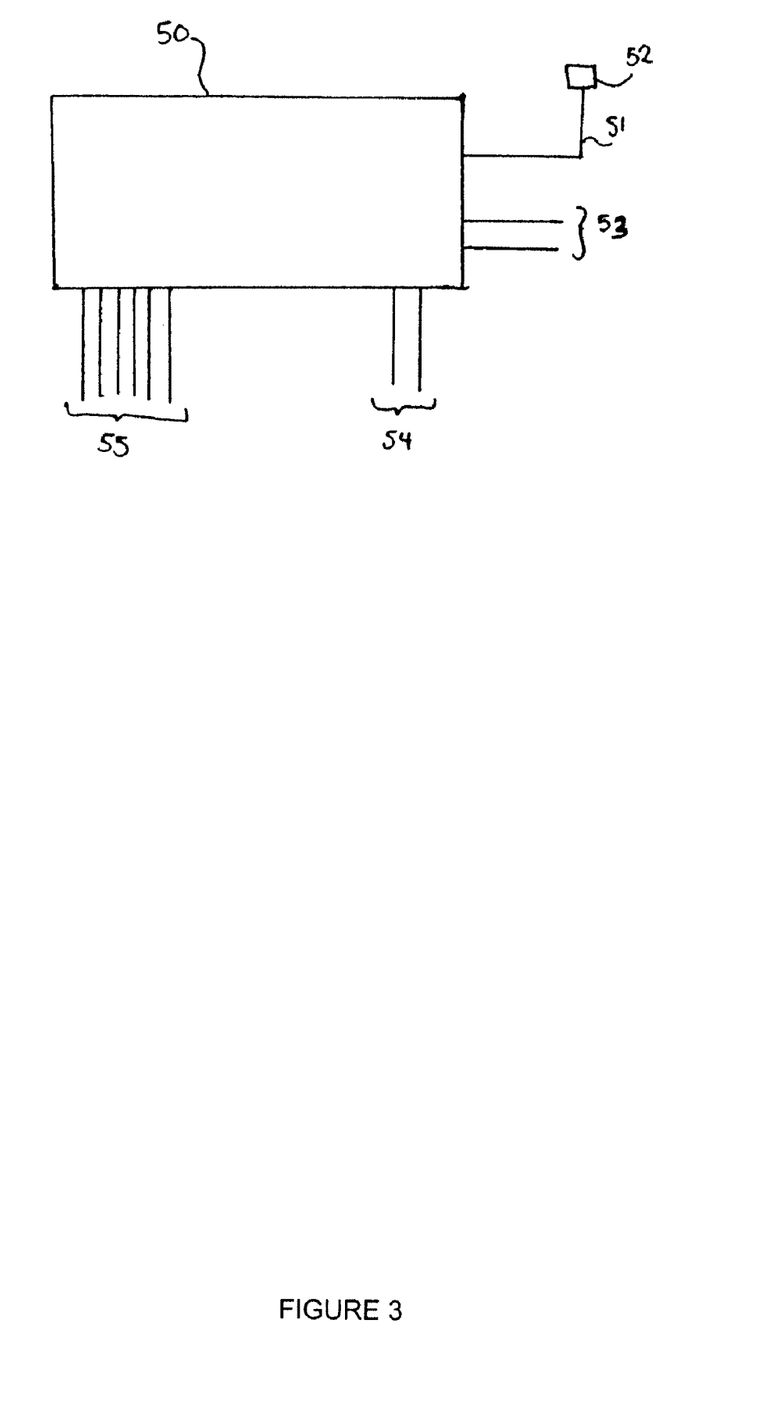
FIG. 3, is a diagrammatic illustration of an electronic control unit for use with the transmission in FIG. 1.

To control the transmission 10, an electronic control unit is provided as diagrammatically illustrated in FIG. 3. The control unit 50 receives input on line 51 from an operator control requesting a gear shift. The control unit 50 is also operable to receive signals on line 53 from sensors generally shown at 54, 55 in FIGS. 1 and 2 to measure the speed rotation of the range shift input shaft 31 and range shift output shaft 32. The controller is operable to control the synchromesh clutches 45, 46, as shown by lines 54, and to control the power shift clutches A, B, C, D, E, R as illustrated by lines 55. In general. the controller 50 is operable to receive an input from the operator control 52 and control the power shift clutches and synchromesh clutches accordingly to provide the next desired gear or torque path through the transmission 10.

Figure 4:
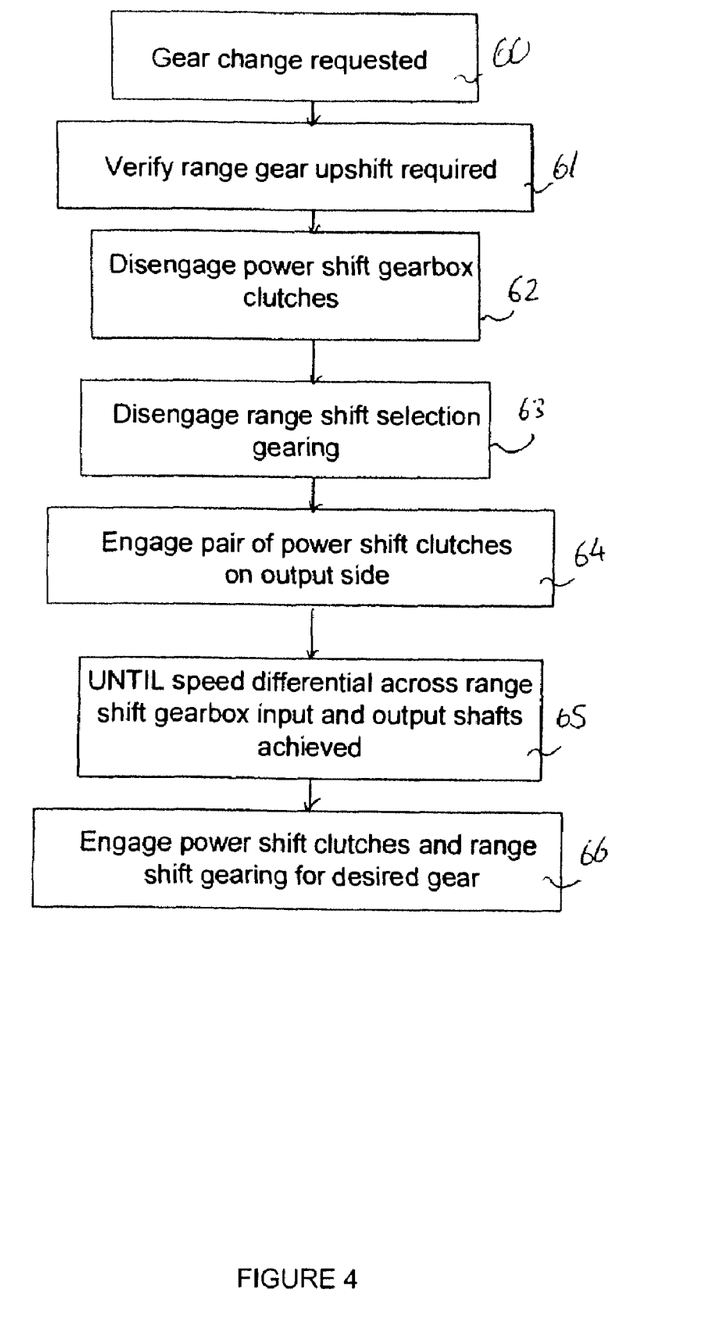
FIG. 4 is an illustration of a first method of operating the transmission of FIG. 1.

When an up-shift gear change in the range shift gear box 12 is required, a first method of controlling the gear change is shown in the flow diagram of FIG. 4. The gear change may be requested by an operator through an operator control 52, or by an automatic gear selection system. The demand for a gear change is sent to the controller 50 at step 60. At step 61, the controller 50 verifies that the gear change requires an up-shift in the range shift gear box 12, and may at this stage notify the operator, for example by operating a display or sounding an audible alert. The input gearing 16 and output gearing 17 of the first gearbox 11 are disengaged, as shown in step 62. At step 63, the range shift selection gearing is disengaged, by operating the first synchromesh clutch 45 or second synchromesh clutch 46 so that both synchromesh clutches 45, 46 are in neutral.

At step 64, a pair of the clutches of the second plurality of clutches (C, D, E) are engaged. In this example, this is clutch pair C and D as these are the lowest ratio gears but any appropriate pair of clutches may be engaged as desired. Whichever clutch pair is used, the inter-meshing pair of gears in the output gearing 21 will be attempting to drive meshing pairs of the intermediate gearing 26 at different speeds, with a consequent retardation of the shaft 20 and correspondingly if the range shift gear box input shaft 31. The clutch pair can be pulsed appropriately to provide a desired retardation until the rotational speeds of the range shift input shaft 31 and range shift output shaft 32 are at a desired ratio. In particular the desired ratio may be selected such that the rotational speeds of the meshing part of the required input and output gear of the next selected gear of the range shift gear box 12 are substantially equal. In this example, the speed sensors 54, 55 are used to detect the rotational speed of the shafts 31, 32, but it will be apparent that sensors may be located anywhere else as appropriate.

Alternatively, a predetermined dwell time may be allowed to elapse. This is a pre-programmed operational time in which the clutch pair is operated depending on which gear is being selected. This alternative may not require data from sensors 54, 55.

At step 66, the selected gear is engaged by operating the appropriate synchromesh clutch 45, 46 and selecting the appropriate gears from the input side clutches A, B, R and output side clutches C, D, E of the power shift gear box 11.

Figure 5:
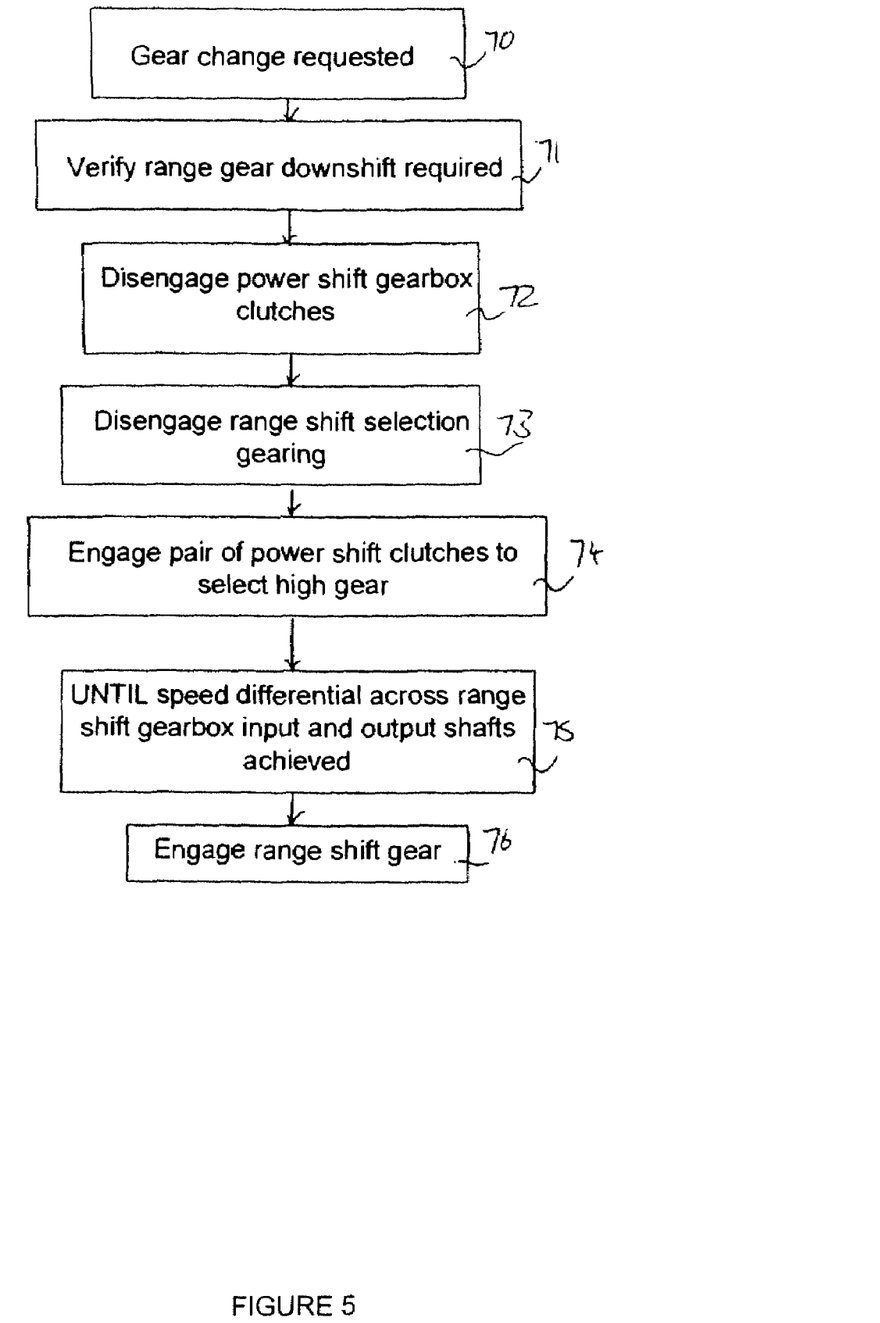
FIG. 5 is an illustration of a second method of operating the transmission of FIG. 1.

When a down-shift gear change in the range shift gear box 12 is required, a second method of controlling the gear change is shown in the flow diagram of FIG. 5. A gear change 70 is requested, for example by an operator through an operator control 52 or through an automatic gear selection system. At step 71, the controller 50 verifies that the gear change requires a down-shift In the range shift gear box 12, and may at this stage notify the operator, for example, by operating a display or sounding an audible alert. The input gearing 16 and output gearing 17 of the first gear box 11 are disengaged as shown in step 72. At step 73, the range shift selection gear may be disengaged, by operating the first synchromesh clutch 45 or second synchromesh clutch 46 such that both synchromesh clutches 45, 46 are in neutral. At step 74, a pair of power shift clutches are engaged comprising one of the first plurality of clutches and one of the second plurality of clutches. In this example, this is the clutch pair B and E, connecting the input gearing 16 and 17 output gearing to provide a torque path through the power shift gear box 11. In this example, B and E correspond to the highest ratio torque path through the gear box 11. As the output shaft 20 is in driving connection with the input shaft 15, the range shift input shaft 31 is consequentially being driven through the power shift gear box 11. Accordingly, the range shift input shaft 31 is sped up, bringing the input gear of the range shift gear box 12 closer to the synchroniser speed. As shown at step 75, the range shift input shaft 31 can be driven as desired, for example by using a standard dwell time, or by using the speed sensors 54, 55 to detect the rotational speeds of the shafts 31, 32, or otherwise as desired. At step 76, none of the first synchromesh clutch 45 and second synchromesh clutch 46 is operated to select the appropriate gear ratio in the range shift gear box 12. By bringing the speeds of the input and output shafts 31, 32 together, this reduces the amount of work that the synchronisers of the synchromesh clutches 45, 46 have to perform to engage the selected gear, which result in a faster gear shift, less wear on the synchronisers, and improved operator feel.

In either method, where the power shift clutches are released, it may be preferable only to partially release the power shift clutches. In the present example, the power shift clutches A, B, C, D, E, R typically have 4 mm of travel, but only 0.25 mm of that range of travel brings the clutches into engagement. Accordingly by only partially releasing the power shift clutches during steps 63 and 73, the time taken to re engage the clutches can be reduced as it is not necessary for the clutches to move across the full range of travel.

Consequently, by operating the gear box in this manner, it is possible to speed up gear shifts involving a change in range selection, providing improved operation and operator comfort.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of controlling a vehicle transmission during a gear change thereof, the vehicle transmission including
   a power shift gearbox and
   a range shift gearbox,
   the power shift gearbox having a power shift input shaft, a power shift output shaft, power shift input gearing and power shift output gearing, and a plurality of power shift clutches to drivingly connect the power shift input gearing and the power shift output gearing,
   the range shift gearbox having a range shift input shaft drivingly connected to the power shift output shaft, a range shift output shaft and range selection gearing to drivingly connect the range shift input shaft and range shift output shaft,
   the method comprising the steps of:
   operating the plurality of power shift clutches to disengage the power shift input gearing and the power shift output gearing,
   disengaging the driving connection between the range shift input shaft and the range shift output shaft by means of the range selection gearing;
   engaging at least two of the power shift clutches to vary the rotational speed of the power shift output shaft and hence the range shift input shaft, and
   operating the range selection gearing to establish a driving connection between the range shift input shaft and the range shift output shaft.

2. A method according to claim 1 wherein the method includes the subsequent step of controlling the plurality of power shift clutches to establish a driving connection between the power shift input shaft and power shift output shaft.

3. A method according to claim 1 or claim 2 wherein the plurality of power shift clutches comprises a first plurality of power shift clutches operable to connect the power shift input gearing to an intermediate gearing and a second plurality of power shift clutches operable to connect the intermediate gearing to the power shift output gearing, and wherein the step of operating the plurality of power shift clutches to disengage the power shift input gearing and the power shift output gearing comprises disengaging the first plurality of power shift clutches.

4. A method according to claim 3 wherein the step of operating the power shift clutches comprises dithering the fluid pressure supplied to the clutches.

5. A method according to any preceding claim wherein the method is carried out during an up-shift gear change.

6. A method according to claim 5 wherein the step of engaging at least two of the power shift clutches retards the rotational speed of the power shift output shaft.

7. A method according to claim 6 wherein the plurality of power shift clutches comprises a first plurality of power shift clutches operable to connect the power shift input gearing to a intermediate gearing and a second plurality of power shift clutches operable to connect the intermediate gearing to the power shift output gearing, and wherein the step of operating the plurality of power shift clutches to disengaging the power shift input gearing and the power shift output gearing comprises disengaging the first plurality of power shift clutches, and wherein the step of operating at least two of the power shift clutches comprises operating at least tow of the second plurality of power shift clutches.

8. A method according claims 5 wherein the rotational speed of the range shift input shaft is retarded until the ratio of the rotational speeds of the range shift input shaft and the range shift output shaft reaches a desired value.

9. A method according to claim 8 wherein the desired value corresponds to the rotational speeds of the meshing gears of the range shift gearing being substantially equal.

10. A method according claims 1 wherein the method is carried out during a down shift gear change.

11. A method according to claim 10 wherein the plurality of power shift clutches comprises a first plurality of power shift clutches operable to connect the power shift input gearing to an intermediate gearing and a second plurality of power shift clutches operable to connect the intermediate gearing to the power shift output gearing, and wherein the step of operating the plurality of power shift clutches to disengage the power shift input gearing and the power shift output gearing comprises disengaging the first plurality of power shift clutches, and wherein the step of engaging at least two of the powershift clutched comprises engaging one of the first plurality of clutches and one of the second plurality of clutches.

12. A method according to claim 11 wherein the powershift clutches are operated to select a higher ratio torque path through the powershift gear box.

13. A method according to claim 1 comprising the step of receiving a gear shift request from an operator control, and identifying that the shift requires a range shift change.

14. A method according to 1 wherein the rotational speed of the range shift input shaft is monitored by a first sensor.

15. A method according to claim 1 wherein the rotational speed of the rang shift output shaft is monitored by a second sensor.

16. A method according to claim 14 wherein the rotational speed of the rang shift output shaft is monitored by a second sensor and wherein data from the first and second sensors is compared to determine whether further variation of the speed of the input gearing is required.

17. The control unit operable to control a vehicle transmission during a gear change thereof, the vehicle transmission including
 a power shift gearbox and
 a range shift gearbox,
 the power shift gearbox having a power shift input shaft, a power shift output shaft, power shift input gearing and power shift output gearing, and a plurality of power shift clutches to drivingly connect the power shift input gearing and the power shift output gearing,
 the range shift gearbox having a range shift input shaft drivingly connected to the power shift output shaft, a range shift output shaft and range selection gearing to drivingly connect the range shift input shaft and range shift output shaft,
 the control unit being operable to perform the steps of:
 operating the plurality of power shift clutches to disengaging the power shift input gearing and the power shift output gearing,
 disengaging the driving connection between the range shift in put shaft and the range shift output shaft by means of the range selection gearing,
 engaging the least two of the power clutches to vary the rotation speed of the power shift output shaft and hence the range shift input shaft, and
 operating the range selection gearing to establish a driving connection between the range shift input shaft and the range shift output shaft.

* * * * *